United States Patent Office 2,941,966
Patented June 21, 1960

2,941,966

CARBODIIMIDE POLYMERS

Tod W. Campbell, Wilmington, Del., assignor to E. I. du Pont de Nemours and Company, Wilmington, Del., a corporation of Delaware No Drawing. Filed Aug. 27, 1956, Ser. No. 606,188

14 Claims. (Cl. 260—2.5)

This invention relates to novel polymers, and more particularly to polymers having a plurality of carbodiimide linkages.

It is an object of the present invention to provide novel polymers. A further object is to provide polymers having a plurality of carbodiimide linkages which have outstanding properties in that they are capable of being formed into fibers, films, sheets, elastomers, and all types of shaped articles. A still further object is to provide processes for the preparation of these novel polymers. Other objects will appear hereinafter.

These and other objects of the following invention are accomplished by high molecular weight polymers containing more than two intralinear carbodiimide linkages. For purposes of the present invention, these polymers should have a molecular weight of at least about 750. The novel polymers of the present invention are characterized by the fact that they are of a high molecular weight, that is, a molecular weight of at least about 750, and that they contain a plurality of intralinear carbodiimide linkages, that is, —N=C=N— linkages.

The novel polymers of the present invention may be prepared by several general procedures involving the treatment of an organic polyisocyanate with a phosphorus-containing catalyst. Any organic polyisocyanate may be used, including aliphatic, cycloaliphatic, and aromatic types, or any combination of these. These organic polyisocyanates may contain other substituents; however, it is readily apparent that these substituents should not be reactive with the isocyanate groups. Therefore, they should not be of the active hydrogen-containing type which display activity according to the Zerewitinoff test. Polymeric compositions containing free isocyanate groups may also be used. Suitable phosphorus-containing catalysts which may be used to prepare these novel polymers include phospholines, phospholine oxides and sulfides, phospholidines and phospholidine oxides and sulfides.

In preparing the polymers of the present invention, it is necessary merely to treat an organic polyisocyanate with a catalytic amount of the phosphorus-containing catalyst. The reaction involved is between the isocyanate groups so as to form a plurality of carbodiimide linkages with the liberation of carbon dioxide.

As mentioned above, the catalysts which are useful in preparing the polymers of the present invention include phospholines, phospholine oxides and sulfides, phospholidines and phospholidine oxides and sulfides. The phospholine oxides and sulfides are described in U.S. Patents 2,663,737 and 2,663,738. The phospholidine oxides are described in U.S. Patent 2,663,739. The corresponding phospholines and phospholidines may be prepared by a lithium aluminum hydride reduction of the corresponding dichloro phospholine or phospholidine. These dichloro compounds are also used to prepare the above mentioned oxides and sulfides and are described in U.S. Patent 2,663,736. Representative phospholines include 1-phenyl-3-phospholine, 3-methyl-1-phenyl-3-phospholine, 1-ethyl-3-phospholine, 3-isopropyl-1-phenyl-3-phospholine, and 3-(4-methyl-3-pentenyl)-1-phenyl-3-phospholine. Of the phospholine oxides and sulfides which may be used, the following may be mentioned: 3-methyl-1-phenyl-3-phospholine 1-oxide, 1-ethyl-3-methyl-3-phospholine 1-oxide, 1-ethylphenyl-3-methyl-3-phospholine 1-oxide, 3-(4-methy-3-pentenyl)-1-phenyl-3-phospholine 1-oxide, 3-chloro-1-phenyl-3-phospholine 1-oxide, 1,3-diphenyl-3-phospholine 1-oxide, 1-ethyl-3-methyl-3-phospholine 1-sulfide, 1-phenyl-3-phospholine 1-sulfide, and 2-phenylisophosphindoline 2-oxide. Representative phospholidines include 1-phenylphospholidine, 3-methyl-1-phenylphospholidine, 1-ethyl-3-methylphospholidine, and 1-ethylphospholidine. Suitable phospholidine oxides include 1-ethyl-3-methylphospholidine 1-oxide and 1-phenylphospholidine 1-oxide. For purposes of preparing the novel polymers of the present invention, the preferred catalysts are 1-ethyl-3-methylphospholidine and 1-ethyl-3-methyl-3-phospholine 1-oxide.

Since these phosphorus-containing compounds serve as catalysts for the preparation of the novel polymers of the present invention, catalytic amounts of these compounds should be used, such as from about 0.01–10.0 parts of catalyst per 100 parts of organic polyisocyanate. It is to be understood that the particular amount of catalyst used will depend to a large extent on the reactivity of the specific catalyst and organic polyisocyanate being used.

In preparing the novel polymers of the present invention, the organic polyisocyanates may be polymerized in any convenient fashion, such as in bulk or in solution. As the polymerization proceeds, carbon dioxide is liberated and it may be vented from the reaction medium if desired. When a solution polymerization is carried out, any inert solvent, such as benzene, toluene, xylene, acetonitrile, nitromethane, 2-nitropropane, N-nitrosodimethylamine, methyl amyl ketone, and anisole, may be used. In treating the organic polyisocyanates with the phosphorus-containing catalysts, temperatures of from about room temperature to about 300° C. may be used, with a preferred temperature range of from about 100–200° C. In carrying out the process by a solution polymerization, the temperature of the reaction may be conveniently controlled by choosing a solvent which refluxes at the desired temperature and then maintaining the reaction mixture at reflux. It is readily apparent that the length of time necessary to complete the polymerization of the organic polyisocyanate may be varied within wide limits. The time will depend to a large extent on the reactivity of the particular organic polyisocyanate, catalyst and temperature which is being used.

As mentioned above, the novel polymers of the present invention are characterized by the fact that they are of a high molecular weight and that they contain a plurality, that is more than two, intralinear carbodiimide linkages. The radicals between the carbodiimide linkages may be any organic radical, such as an aliphatic, cycloaliphatic and aromatic type, or any combination of these. It is to be understood that any organic polyisocyanate, that is, any organic compound containing two or more free isocyanate groups, may be used to prepare the polymers of the present invention.

When preparing the polymers of the present invention from an organic diisocyanate, the reaction may be illustrated as follows:

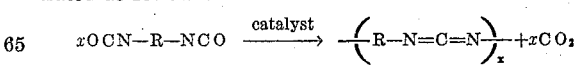

wherein R is a bivalent organic radical and $x$ is an integer greater than 2. It is readily apparent that when an organic diisocyanate is used, the resulting polymer is substantially linear.

Representative organic diisocyanates which may be used include 2,4-tolylene diisocyanate, m-phenylene diisocyanate, 4,4'-methylene(di-p-phenylene) diisocyanate, 4-chloro-1,3-phenylene diisocyanate, 4,4'-biphenylene diisocyanate, 1,5-naphthylene diisocyanate, tetramethylene diisocyanate, hexamethylene diisocyanate, decamethylene diisocyanate, 1,4-cyclohexylene diisocyanate, 4,4'-methylenedicyclohexylene diisocyanate, and 1,5-tetrahydronaphthylene diisocyanate. For purposes of the present invention, the aromatic diisocyanates are preferred. Mixtures of two or more organic diisocyanates may be used, in which case the bivalent organic radical R in the above formula will not be the same in each recurring unit. Organic triisocyanates, such as 2,4,6-triisocyanatotoluene and p-isocyanatophenyl 2,4-diisocyanatophenyl ether may be used to prepare polymers within the scope of the present invention. With the use of triisocyanates, the resulting polymers contain a plurality of carbodiimide linkages, are of high molecular weight, and are substantially cross-linked.

Organic polymers having free isocyanate groups may also be used to prepare the novel carbodiimide polymers of the present invention. Representative isocyanate-containing polymeric organic compounds may be obtained by the reaction of a polymeric material which may contain terminal hydroxyl, amino or carboxyl groups, with a molar excess of a polyisocyanate. In the case of a glycol such as a polyalkyleneether glycol, an isocyanate-terminated polyether polyurethane is obtained upon reaction with a molar excess of an organic diisocyanate. Representative glycols which may be used to react with an organic diisocyanate include polyalkyleneether glycols, polyalkylenearyleneether glycols, polyalkyleneether-thioether glycols, polyalkylene-aryleneether-thioether glycols, polyester glycols, polyhydrocarbon glycols, etc. For purposes of the present invention, a polyalkyleneether glycol, more specifically, a polytetramethyleneether glycol, is preferred. It is to be understood that mixtures of two or more organic polymers containing free isocyanate groups may be used.

Polymeric compounds having more than two free isocyanate groups may be treated with the phosphorus-containing catalysts to prepare novel carbodiimide polymers within the scope of the present invention. These polymeric compounds may be prepared, for example, from trifunctional reactants. Thus, one mol of castor oil may be reacted with 3 mols of a diisocyanate to obtain a compound having three reactable isocyanate groups. One mol of trimethylol propane, 2 mols of polytetramethyleneether glycol and 2 mols of adipic acid are reacted to form a polyester having three hydroxyl groups. This polyester is then reacted with 3 mols of a diisocyanate to form a polymer having three reactable isocyanate groups.

The novel polymers of the present invention are of a high molecular weight and contain a plurality of carbodiimide linkages. As mentioned above, if they are prepared from an organic diisocyanate, they are substantially linear; whereas if they are prepared from an organic compound containing more than two free isocyanate groups, the resulting polymers are substantially cross-linked. For purposes of the present invention, the resulting polymers should have molecular weights of at least about 750. As the reaction proceeds in the preparation of these polymers, essentially all of the isocyanate groups are utilized to form carbodiimide linkages and, as a result, the resulting polymers are relatively stable.

The carbodiimide polymers may be formed into a wide variety of shaped articles, including fibers, films, sheets, etc. Solvent solutions can be used for coating surfaces and to form supported or unsupported films. The polymers show good adhesion to glass and are, therefore, useful as glass finishes. Polymers which are prepared from organic compounds containing more than two free isocyanate groups are particularly useful in the preparation of cellular products. In addition to the above uses, the polymers of the present invention, more particularly the substantially linear polymers which are prepared from isocyanate-terminated polyurethanes, e.g., those prepared from a polyalkyleneether glycol with a molar excess of an organic diisocyanate, may be cured to form highly useful elastomers. Depending on the types of diisocyanate which are used, the curing of these polymers may be effected by various curing procedures. The substantially linear polymers may be cured with peroxides in the conventional way by incorporating about 1–3% of a peroxide, such as dicumyl peroxide, benzoyl peroxide, etc., and then heating. Polymers having aliphatic unsaturation in the molecule may be cured with sulfur. In particular, those polymers containing a plurality of carbodiimide linkages and having side chains terminating in —CH=CH$_2$ groups give excellent cures with sulfur. A sulfur curable polymer containing a plurality of carbodiimide linkages may be prepared by treating with the phosphorus-containing catalyst, a mixture of polymer containing terminal isocyanate groups prepared from a molar excess of an organic diisocyanate and a polyalkyleneether glycol, and an organic diisocyanate, prepared from a molar excess of an organic diisocyanate reacted with a non-polymeric glycol containing a side chain unsaturated group.

The substantially linear polymers of the present invention containing a plurality of carbodiimide linkages may be reacted with amines to form highly useful polymers which contain a plurality of guanidine linkages. When a monoamine, such as aniline or tert.butylamine, is used to react with a carbodiimide polymer, the resulting product is a substantially linear polymer containing a plurality of guanidine groups. When a diamine, such as bis(4-aminocyclohexyl)methane, ethylenediamine, hexamethylenediamine, 2,4-tolylenediamine, etc., is used, the resulting product is a substantially cross-linked polymer containing a plurality of guanidine groups. These guanidine polymers may be formed into a wide variety of shaped articles, such as fibers, films, etc. The substantially cross-linked guanidine polymers are particularly suitable as elastic fibers.

Similarly, the linear polymers of this invention may be reacted with alcohols or glycols to yield highly useful polymers containing a plurality of isourea ether linkages.

The novel polymers of the present invention may be compounded with various agents, such as carbon black, clay, silica, talc, zinc and magnesium oxides, calcium and magnesium carbonate, titanium dioxide, and plasticizers. In addition, organic and inorganic coloring agents may be incorporated with the polymers to give well-defined colors.

The following examples will better illustrate the nature of the present invention; however, the invention is not intended to be limited to these examples. Parts are by weight unless otherwise indicated. The initial modulus is determined by measuring the initial slope of the stress-strain curve. Tensile recovery is the percentage returned to the original length within one minute after the tension has been released from a sample which has been elongated 50% at the rate of 100% per minute and held at 50% elongation for one minute. Stress decay is the percent loss in stress in the yarn one minute after it has been elongated to 50% at the rate of 100% per minute.

*Example 1*

A mixture of 25 parts of 2,4-tolylene diisocyanate and 0.2 part of 3-methyl-1-phenyl-3-phospholine is heated at 100° C. Carbon dioxide is evolved, and after three hours, the reaction mixture has thickened to a solid mass. After an additional half-hour at 156° C., the poly(2,4-tolylenecarbodiimide) is pressed into a film at 250–300° C. Infrared examination of this tough, polymeric film shows a high concentration of carbodiimide linkages with no evidence of residual isocyanate groups, or urea linkages. The infrared band at 4.75 microns is characteristic of the carbodiimide group. Although the polymer may be molded at 250–300° C., the temperature at which it leaves a molten trail on a hot bar is about 350° C.

In a similar manner, 5-tert.butyl-2-methyl-1,3-phenylene diisocyanate, 4,4'-oxydiphenylene diisocyanate, 2,4,6-trimethyl-1,3-phenylene diisocyanate and durylene diisocyanate may be polymerized.

*Example II*

A mixture of 10 parts of 2,4-tolylene diisocyanate and 0.03 part of 1-ethyl-3-methyl-3-phospholine 1-oxide is heated in decahydronaphthalene to reflux. Within five minutes, the polymer precipitates from the solvent in the form of small, fluffy particles. The poly(2,4-tolylene-carbodiimide) is filtered, dried, and pressed at 275° C. into clear film which can be cold drawn. The film has an extremely high order of resistance to tear. Thin pieces of the film are boiled with 10% sulfuric acid, 10% sodium hydroxide, and 10% ethanolamine in water. Infrared spectra of the various samples indicate substantially no attack by these reagents on the film.

4,4' - methylenedicyclohexylene diisocyanate may be polymerized in a similar manner to yield a hard polymer which may be pressed into a film.

*Example III*

Methylenedi(p-phenylene) diisocyanate is polymerized according to the method described in Example I, using 3-methyl-1-phenyl-3-phospholine as a catalyst, except that the final heating period is one hour at 180° C. The hard, solid polymer is pressed into a clear, yellowish film at 300° C. The film is tough and may be flexed through 180° repeatedly without cracking. Infrared examination shows the characteristic band at 4.75 microns. The poly[methylenedi(p-phenylene)carbodiimide] is analyzed for carbon, hydrogen, and nitrogen content. Calculated for $C_{14}H_{10}N_2$: C, 81.52%; H, 4.89%; N, 13.59%. Found: C, 81.78%; H, 4.94%; N, 12.7%.

*Example IV*

A mixture of 20 parts of methylenedi(p-phenylene) diisocyanate, 0.03 part of 1-ethyl-3-methyl-3-phospholine 1-oxide, and 130 parts of xylene is heated to reflux. After about 3¾ hours, the precipitation of polymer appears to be complete. The polymer is isolated by filtration, washed with benzene, and dried. Some of the product precipitates in the form of short lengths of fiber. These are drawn over a hot pin at 150° C. and possess the following average properties: tenacity, 3.9 g.p.d.; elongation, 20%; initial modulus, 35 g.p.d. X-ray examination of these fibers shows a very high degree of orientation coupled with about 30% crystallinity.

*Example V*

A solution of 10 parts of 3,3'-dimethoxy-4,4'-biphenylene diisocyanate and 0.4 part of 3-methyl-1-phenyl-3-phospholine is heated to reflux in 87 parts of xylene. After four hours, the polymer begins to precipitate. The mixture is heated for an additional hour, and the polymer is then filtered, washed with benzene, and dried. The solid, white polymer displays an infrared absorption band at 4.75 microns. The dry polymer is pressed to a clear, slightly yellowish film at temperatures from 200–250° C. Strips of this film may be oriented by elongating to four times the original length over a hot pin at 120–150° C. to yield samples showing a strong birefringence under the polarizing microscope. The drawn film strips show a high degree of orientation and about 30% crystallinity when examined by X-ray techniques. Calculated for $C_{15}H_{12}N_2O_2$: C, 71.4%; H, 4.8%; N, 11.1%. Found: C, 70.8%; H, 4.6%; N, 10.8%. A film of the polymer exhibits outstanding electrical insulating properties.

*Example VI*

To a solution of 15 parts of hexamethylene diisocyanate in 22 parts of xylene is added about 0.15 part of 1-ethyl-3-methyl-3-phospholine 1-oxide. The mixture is heated to reflux and after six hours the polymer has precipitated. The product is removed, suspended in acetone, and cut to fine particles in a Waring Blendor. The polymer is a non-tacky, rubbery product which may be pressed into films. The polymer shows the characteristic infrared band at 4.75 microns.

*Example VII*

A mixture of 7 parts of 4-isopropyl-1,3-phenylene diisocyanate, 0.03 part of 1-ethyl-3-methyl-3-phospholine 1-oxide, and 68 parts of decahydronaphthalene is heated to reflux. After four hours, no polymer precipitates, but the infrared spectrum of the solution shows a strong carbodiimide band with no residual isocyanate functionality. The solvent is partially evaporated and the polymer is precipitated by the addition of petroleum ether. There is obtained 4.3 parts of the polycarbodiimide. It is moldable into a tough film at 250° C.

*Example VIII*

A mixture of 15 parts of 4,4'-biphenylene diisocyanate, 0.03 part of 1-ethyl-3-methyl-3-phospholine 1-oxide, and 130 parts of xylene is heated to reflux. After four hours of reflux, a fine, white precipitate is filtered, washed twice with benzene, and dried. The poly(biphenylene-carbodiimide) so obtained is converted under pressure at 320° C. to a clear, slightly yellowish, tough film. The polymer is over 30% crystalline as determined by X-ray methods.

*Example IX*

To a solution of 20 parts of 3,3'-dimethyl-4,4'-biphenylene diisocyanate in 175 parts of xylene is added 0.5 part of 3-methyl-1-phenyl-3-phospholine. The mixture is refluxed for about 24 hours, after which the precipitated polymer in the form of bright yellow fibrils is filtered, washed, and dried in the usual manner. A tough film is obtained from the polymer by pressure at 275° C. A portion of the film, when ignited in a flame, is self-extinguishing when removed from the flame.

*Example X*

A mixture of 25 parts of 3,3'-dimethoxy-4,4'-biphenylene diisocyanate and 22.1 parts of methylenedi(p-phenylene) diisocyanate with 0.03 part of 1-ethyl-3-methyl-3-phospholine 1-oxide, is dissolved in 260 parts of xylene and refluxed overnight. The polymer, isolated and dried in the usual manner, is pressed into stiff, clear film at 225° C. The film may be cold drawn.

In a similar manner, a mixture of 25 parts of 3,3'-dimethoxy-4,4'-biphenylene diisocyanate and 25 parts of 3,3'-dimethyl-4,4'-biphenylene diisocyanate is polymerized.

*Example XI*

A mixture of 50 parts of polyethylene glycol of a molecular weight about 1000, 26.1 parts of 2,4-tolylene diisocyanate, and 0.05 part of thionyl chloride are heated at 90–95° C. for one hour. To the polyether now bearing isocyanate end groups is added 1.5 parts of 3-methyl-1-phenyl-3-phospholine. The mixture is mixed in a Werner-Pfleiderer mixer at 70–100° C. for two hours. During this period, carbon dioxide is evolved and the mass thickens. The mixture is then milled on a rubber mill for one hour at 70° C. and then for one-half hour at 100° C. When molded under pressure at 120° C., a clear amber, rubbery sheet is obtained, which has good snap and elasticity.

*Example XII*

(A) Dry polytetramethyleneether glycol having an average molecular weight of approximately 1000 is reacted with 2,4-tolylene diisocyanate in a 2:1 molar ratio by heating for three hours on the steam bath under nitrogen so as to form a hydroxyl-terminated polymer. A mixture of 76.5 parts of this polymer and 19.1 parts of methylenedi(p-phenylene) diisocyanate is heated for one hour on the steam bath to yield a polymer with terminal isocyanate groups. 0.6 part of 3-methyl-1-phenyl-3-phospholine and 260 parts of xylene are added. The mixture is refluxed for three hours, after which time a viscosity suitable for spinning is achieved. The viscous solution is dry-spun in the conventional manner to give 27-denier, elastic fibers. A 5-filament yarn has a tenacity of 0.5 g.p.d., an elongation of 554%, and an initial modulus of 0.01 g.p.d. The filaments stick to a hot bar at about 165° C. A film cast from the viscous solution is clear and extremely tough.

(B) The polymer of (A) above with terminal isocyanate groups is copolymerized with 10% by weight of methylenedi(p-phenylene) diisocyanate by the process described in (A) above, using 1-ethyl-3-methyl-3-phospholine 1-oxide as a catalyst. Yarn prepared in similar fashion has a softening temperature of about 190° C.

(C) A portion of the viscous solution used for spinning in (A) above is wet-spun into a precipitating bath consisting of about 1% by weight of bis(4-aminocyclohexyl)methane in hexane. Due to cross-linking produced by reaction of the diamine with the carbodiimide linkages to form guanidine groups, the fiber sets up rapidly and is wound up readily. After a boil-off in water for 45 minutes, the elastic monofilament yarn has a tenacity of 0.22 g.p.d., elongation of 455%, initial modulus of 0.04 g.p.d., stress decay of 12%, and tensile recovery of 92%.

*Example XIII*

A mixture of 33.7 parts of polytetramethyleneether glycol having an average molecular weight of about 2000 is heated on the steam bath for 1½ hours with 8.7 parts of methylenedi(p-phenylene) diisocyanate. The reaction product is diluted with 190 parts of xylene containing 0.1 part of 1-ethyl-3-methyl-3-phospholine 1-oxide. After refluxing for about 1 hour, a viscous solution suitable for spinning is obtained. This solution remains free of gel for over 48 hours. A yarn, when prepared from this viscous solution as in Example XII, has similar physical properties. The viscous solution may be cast to yield a clear, very tough, snappy sheet of elastomer. A strip of this sheet elongated 600% shows good recovery.

*Example XIV*

A polyester with hydroxyl end groups and a molecular weight of about 2000 is prepared in the usual manner by heating sebacic acid with excess 2,2-diethylpropanediol. Water and finally a small amount of excess glycol are removed at reduced pressure.

A mixture of 23 parts of this polyester was heated for 1.5 hours on the steam bath with 5.8 parts of methylenedi(p-phenylene) diisocyanate. The reaction mixture is then diluted with 85 parts of xylene containing 0.1 part of 1-ethyl-3-methyl-3-phospholine 1-oxide. After about one hour at reflux a very viscous solution is obtained. A slab of tough, clear, rubber-like polymer is obtained by casting this solution. A strip of this polymer stretched 700% returns to a length about 10% greater than the original length. The polymer, insoluble in tetrahydrofuran, dimethylformamide, and acetone, may be molded at 200° C. and 10,000 p.s.i. into a clear film which may be elongated to 600% of its original length.

*Example XV*

145 parts of polytetramethyleneether glycol having an average molecular weight of 3400 is heated with 17.1 parts of 2,4-tolylene diisocyanate at 100° C. for two hours. The cooled product is transferred to a Werner-Pfleiderer mixer. After the addition of 0.8 part of 3-methyl-1-phenyl-3-phospholine, mixing is carried out at 80–100° C. for four hours. The tough, rubbery mass is milled on a rubber roll mill to give a rough, nervy sheet, a portion of which is molded under pressure for one hour at 132° C. The resulting elastomer has the following properties at room temperature: tensile strength, 2400 p.s.i.; elongation, 500%; modulus at 300% elongation, 486 p.s.i.

*Example XVI*

A mixture of 11.4 parts of 4,4'-isopropylidenediphenol and 25 parts of methylenedi(p-phenylene) diisocyanate is refluxed in 85 parts of xylene for two hours to yield essentially a diurethane having terminal isocyanate groups. 0.3 part of 3-methyl-1-phenyl-3-phospholine is added and heating is continued for about one-half hour at 140° C. Polymerization occurs rapidly, and the polymer is isolated as a hard, tough product. Calculated for $C_{44}H_{36}N_4O_4$: C, 77.2%; H, 5.3%; N, 8.2%. Found: C, 77.5%; H, 5.2%; N, 7.6%.

*Example XVII*

A solution of 13.6 parts of m-(1-isocyanatoethyl)-phenyl isocyanate in 85 parts of xylene is heated to the boiling point and 0.02 part of 3-methyl-1-phenyl-3-phospholine 1-oxide is added. A very rapid evolution of carbon dioxide occurs within the first ten minutes. The rate of evolution then decreases, and several hours are required to complete the reaction. The polymer is precipitated with petroleum ether, dried and pressed at 200° C. into a film, which is stiff, rather brittle, and less tough than films made from fully aromatic polycarbodiimides.

*Example XVIII*

A solution of 10 parts of 2,4-tolylene diisocyanate in 50 parts of boiling diphenylmethane is treated with 0.03 part of 1-ethyl-3-methyl-3-phospholine 1-oxide. A very vigorous evolution of carbon dioxide occurs. After approximately ten minutes at 260° C. the solution is cooled and the polymer precipitated by the addition of acetone. Poly(2,4-tolylenecarbodiimide) is obtained in a yield of about 40% and may be pressed into a clear, tough film.

*Example XIX* p-Nitrophenol and 2,4-dinitrochlorobenzene are condensed in the usual manner to yield p-nitrophenyl 2,4-dinitrophenyl ether, which is then reduced to the triamine. The triamino compound is phosgenated to yield p-isocyanatophenyl 2,4-diisocyanatophenyl ether. This compound is described in U.S. Patent 2,786,864. A solution of 10 parts of this triisocyanate in 68 parts of xylene is treated with 0.03 part of 1-ethyl-3-methyl-3-phospholine 1-oxide. After about two hours at reflux, the hard, cream-colored solid which precipitates is filtered and extrated with benzene. The polymeric product is completely infusible and cannot be molded to a film. These properties are those of a three-dimensional structure.

*Example XX*

A mixture of 5 parts of 2,4-tolylene diisocyanate and 0.03 part of 1-ethyl-3-methyl-3-phospholine 1-oxide is heated under high vacuum at 100° C. for two hours, and then at 140° C. for two hours. A tough, cellular chunk of foamed plastic is obtained having a volume several times that of the starting material.

*Example XXI*

A mixture of 8 parts of m-phenylene diisocyanate, 0.03 part of 1-ethyl-3-methyl-3-phospholine 1-oxide, and 68 parts of decahydronaphthalene is heated to reflux. After about an hour, the precipitated polymer is isolated by decantation. It is washed several times with benzene and is air-dried. There is obtained a quantitative yield of poly(m-phenylenecarbodiimide), which is about 30% crystalline as determined by X-ray examination. Calculated for $C_7H_4N_2$: C, 72.4%; H, 3.4%; N, 24.1%. Found: C, 72.3%; H, 3.5%; N, 23.2%.

In a similar manner p-phenylene diisocyanate, 4-chloro-1,3-phenylene diisocyanate, and 4-methoxy-1,3-phenylene diisocyanate are converted to carbodiimide polymers.

Example XXII 50 parts of 1,5-naphthylene diisocyanate is polymerized in 180 parts of boiling decahydronaphthalene containing 0.1 part of 1-ethyl-3-methyl-3-phospholine 1-oxide. After about two hours, a quantitative yield of poly(1,5-naphthylenecarbodiimide) is obtained as a fine, white powder having a high degree of crystallinity as determined by X-ray methods.

Example XXIII 195 parts of castor oil having a hydroxyl number of 161 and 100 parts of 2,4-tolylene diisocyanate are mixed together and heated at 90° C. for one hour. The resulting product contains three free isocyanate groups per molecule. The mass is cooled to about 50° C. and 2 parts of 3-methyl-1-phenyl-3-phospholine 1-oxide is thoroughly stirred in. The mass is poured immediately into a mold and heated at 100° C. for two hours. A tough, flexible, cellular form is obtained.

Example XXIV 275 parts of polytetramethyleneether glycol having a molecular weight of 2730 is mixed with 57 parts of 2,4,6-triisocyanatotoluene and heated at 90° C. for one hour. The resulting polymer has four free isocyanate groups per molecule. The mass is cooled to 50° C. and 3.0 parts of 3-methyl-1-phenyl-3-phospholine 1-oxide is thoroughly mixed in and the mass is poured into a mold and heated for two hours at 100° C. The resulting cellular product is tough and resilient and is suitable for use in foam-type cushions.

Example XXV (A) 1500 parts of polytetramethyleneether glycol having a molecular weight of 1000 and 522 parts of 2,4-tolylene diisocyanate are stirred together at 80–90° C. for three hours to form an isocyanate-terminated polymer. The mass is then cooled to room temperature.

(B) 99 parts of 3-allyloxy-1,2-propanediol is stirred with 260 parts of 2,4-tolylene diisocyanate at 85° C. for two and one-half hours to form an isocyanate-terminated product. The mass is cooled to room temperature.

(C) The products from (A) and (B) are mixed together in a Werner-Pfleiderer mixer and 45 parts of 3-methyl-1-phenyl-3-phospholine 1-oxide is mixed in. The mass is then mixed and heated to 100° C. for about two hours, at which time it is converted into a rubbery polymer containing side chain allyloxymethyl groups and intralinear carbodiimide linkages. This polymer has an average of one allyloxymethyl group per 3000 molecular weight units. It is removed from the mixer and 100 parts is compounded on a rubber roll mill with 30 parts of high abrasion furnace black, 2 parts of 2,2'-dithiobisbenzothiazole, 1 part of 2-mercaptobenzothiazole, 1 part of sulfur, and 0.8 part of zinc p-methoxydithiocarbanilate. The compounded stock is sheeted off the mill and cured in molds in a press at 140° C. for 90 minutes. The resulting snappy elastomer has a tensile strength at the break, at 25° C., of greater than 4500 pounds per square inch.

Example XXVI 1500 parts of polytetramethyleneether glycol, having a molecular weight of 3000, is heated with 174 parts of 2,4-tolylene diisocyanate in a closed Werner-Pfleiderer mixer at 75° C. for three hours. 20 parts of 3-methyl-1-phenyl-3-phospholine 1-oxide is then added and mixing is continued for two hours. A rubbery mass is formed.

100 parts of this mass is then compounded on a rubber roll mill with 30 parts of high abrasion furnace black and 1 part of dicumyl peroxide and sheeted off the mill. The mass is cured in molds in a press at 135° C. for one hour to yield a tough, snappy elastomer.

Example XXVII (A) A mixture of 11 parts of 2,4-tolylene diisocyanate, 41 parts of toluene, 3.3 parts of dimethyl sulfoxide and 0.03 part of 3-methyl-1-phenyl-3-phospholine 1-oxide is refluxed for about one hour. The extremely viscous solution of poly(2,4-tolylenecarbodiimide) is poured into a rapidly agitated mixture of 15 parts of aniline and 87 parts of hot toluene in a Waring Blendor. A semi-solid curd-like material which can be pressed into clear, very stiff film at 275° C. precipitates. The infra-red spectrum of this film displays an absorption band at 6.10 microns which is characteristic of the guanidine linkage.

(B) The experiment described in (A) above is repeated except that tert.butylamine is substituted for aniline. In this case the polyguanidine reaction product remains in solution and can be isolated by evaporation. This polymer, purified by dissolving in dilute aqueous hydrochloric acid followed by precipitation in aqueous ammonia, is dissolved in sufficient 10% sulfuric acid to yield a viscous solution of a poly(guanidinium sulfate) which, on 800-fold dilution with water, yields a solution which foams readily on agitation.

Example XXVIII (A) A mixture of 10 parts of polytetramethyleneether glycol having an average molecular weight of about 2000 is heated on the steam bath for one hour with 2.7 parts of methylenedi(p-phenylene) diisocyanate. The reaction product is diluted with 260 parts of xylene containing 0.06 part of 1-ethyl-3-methyl-3-phospholine 1-oxide. The mixture is refluxed for two hours, yielding a viscous solution. A portion of this solution is cast into a film which absorbs in the infrared at 4.75 microns, thereby showing the presence of carbodiimide linkages. The bulk of the viscous solution is reacted in a Waring Blendor with 90 parts of xylene containing 25 parts of tert.butylamine to form a polyguanidine. A film cast from this solution displays an absorption band at 6.10 microns characteristic of the guanidine linkage, whereas the band at 4.75 microns is absent. Evaporation of the solution yields tough, elastomeric polymer which is soluble in formic acid.

(B) The carbodiimide polymer solution from (A) above is treated with excess gaseous ammonia. On evaporation a tough elastomer insoluble in formic acid is obtained, which may be pressed into a snappy film at 200° C.

As many widely different embodiments of this invention may be made without departing from the spirit and scope thereof, it is to be understood that this invention is not limited to the specific embodiments thereof except as defined in the appended claims.

What is claimed is:

1. A cross-linked infusible polymer consisting essentially of intralinear carbodiimide linkages alternating with organic radicals which are free of any substituents reactive with an isocyanate group, there being at least three carbodiimide linkages per molecule.

2. A polymer which is capable of forming a self-supporting film, said polymer consisting essentially of more than two recurring units, $\{R\!-\!N\!=\!C\!=\!N\}$, wherein R is a bivalent organic radical having no substituents which are reactive with an isocyanate group.

3. The polymer of claim 2 wherein the bivalent organic radical is an aromatic radical.

4. The polymer of claim 3 wherein the bivalent organic radical is a 2,4-tolylene radical.

5. The polymer of claim 3 wherein the bivalent organic radical is a methylenedi(p-phenylene) radical.

6. The polymer of claim 2 wherein R is a bivalent polymeric organic radical.

7. The polymer of claim 6 wherein the bivalent polymeric organic radical is a polyether polyurethane.

8. The polymer of claim 6 wherein the bivalent polymeric organic radical is the radical remaining after removal of the terminal isocyanato groups from an isocyanate-terminated polyether polyurethane, said polyether polyurethane being obtained by the reaction of a polyalkyleneether glycol with a molar excess of an organic diisocyanate.

9. The polymer of claim 8 wherein the said polyalkyleneether glycol is a polytetramethyleneether glycol.

10. A polymer according to claim 1 in the form of a film.

11. A polymer according to claim 1 in the form of a cellular article.

12. A polymer according to claim 2 in the form of a fiber.

13. A polymer according to claim 2 in the form of a film.

14. A process for preparing a high molecular weight polymer having a plurality of intralinear guanidine linkages which comprises reacting (a) a compound selected from the group consisting of an amine and ammonia with (b) a carbodiimide polymer which is capable of forming a self-supporting film and consisting essentially of intralinear carbodiimide linkages alternating with organic radicals which are free of any substituents reactive with an isocyanate group, said carbodiimide polymer having at least three carbodiimide linkages per molecule.

References Cited in the file of this patent

UNITED STATES PATENTS

| | | |
|---|---|---|
| 2,284,896 | Hanford et al. | June 2, 1942 |
| 2,654,680 | Goppel et al. | Oct. 6, 1953 |
| 2,734,045 | Nelson | Feb. 7, 1956 |
| 2,810,711 | Holtschmidt | Oct. 22, 1957 |

FOREIGN PATENTS

| | | |
|---|---|---|
| 924,751 | Germany | Mar. 7, 1955 |

OTHER REFERENCES

Khorana: Chemical Reviews, vol. 53, #2, pp. 145–166, October 1953.

Flory: Principles of Polymer Chemistry, pp. 69–105, Cornell Univ. Press, Ithaca, N.Y., publ., 1953.